US006569541B1

(12) United States Patent
Martin et al.

(10) Patent No.: US 6,569,541 B1
(45) Date of Patent: May 27, 2003

(54) PLASTER-BASED PREFABRICATED STRUCTURAL ELEMENT EXHIBITING WATER RESISTANCE

(75) Inventors: Daniel Martin, Lyons (FR); Théo Theuvsen, Breisach (DE); Régis Humbert, Isle sur la Sorgue (FR)

(73) Assignee: Lafarge Platres, Avignon (FR)

( * ) Notice: Subject to any disclaimer, the term of this patent is extended or adjusted under 35 U.S.C. 154(b) by 0 days.

(21) Appl. No.: 09/501,315

(22) Filed: Feb. 10, 2000

(30) Foreign Application Priority Data

Feb. 12, 1999 (FR) .............................. 99 01885

(51) Int. Cl.⁷ .............................................. B32B 28/00
(52) U.S. Cl. ................ 428/537.5; 428/537.7; 156/39; 156/41; 106/617; 106/632; 106/680
(58) Field of Search ................ 428/537.5, 537.7; 156/39, 41; 106/617, 632, 680

(56) References Cited

U.S. PATENT DOCUMENTS 5,817,262 A * 10/1998 Englert ..................... 264/86

FOREIGN PATENT DOCUMENTS

| JP | 55109251 A | 8/1980 |
| JP | 07330411 A | 12/1995 |
| SU | 1409607 A | 7/1988 |
| WO | WO 9309066 A | 5/1993 |

* cited by examiner

*Primary Examiner*—Leszek Kiliman
(74) *Attorney, Agent, or Firm*—Burns, Doane, Swecker & Mathis, L.L.P.

(57) ABSTRACT

A water-resistant prefabricated structural element comprising a substrate based on cured plaster, said substrate being able to be obtained by at least the following steps:

Figure 1:
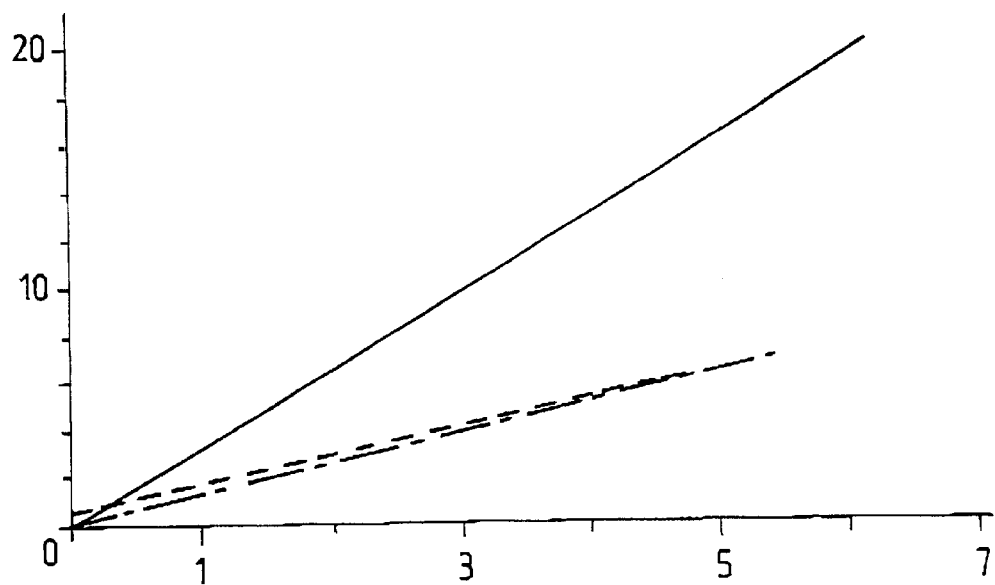

(a) homogeneously mixing a dry material, comprising mostly at least one hydratable calcium sulfate, a water-repellent agent comprising at least one silicone compound, and water and preforming said substrate in the wet state;

(b) drying the preformed substrate in order to obtain said substrate formed in the solid and dry state;

wherein the homogeneous mix, prior to the preforming of the substrate in the wet state, also includes a mineral additive comprising at least one mineral component having a synergistic water-repellency affinity with said silicone compound.

29 Claims, 2 Drawing Sheets

PLASTER-BASED PREFABRICATED STRUCTURAL ELEMENT EXHIBITING WATER RESISTANCE

The present invention relates to prefabricated structural elements comprising a substrate based on cured and dried plaster. More particularly, the invention relates to prefabricated structural elements of the tile, panel and board types. With regard to boards, those relevant to the present invention have a relatively small average thickness, for example ranging from one to a few centimeters, in a preferred direction or dimension, with a limited mass per unit area, for example about 10 kilograms per m$^2$. By way of preferred but nonlimiting example, reference will be made to prefabricated elements of the board type, in the knowledge that at the present time there are, for example, plaster fiberboards in which the plaster contains homogeneously dispersed fibers throughout the mass, these boards being commonly called "GFBs", and plasterboards coated with cardboard or with mats or sheets of mineral fibers (for example glass fibers) on both their faces.

The present application corresponds to French Patent Application No. 99/01885 of Dec. 2, 1999, the text of which is incorporated in that of the present patent application, as required.

The invention applies to other prefabricated elements made of plaster, for example to tiles, or parallelepipedal elements having grooves or slots and tenons on their side edges.

The invention relates to prefabricated structural elements, such as those defined above, having improved water resistance.

The prefabricated structural elements as defined above, having the ability to withstand water, are used either inside buildings, for example in humid rooms such as bathrooms, in order to lay plastic coverings or tiles thereon, or on the outside of buildings, for example for the covering of facades, as long as, nevertheless, these prefabricated elements are coated with an impermeable protective skin.

The expression "water resistant" should be understood to mean the ability of a prefabricated structural element as defined above to limit the uptake of water by the plaster substrate, while still retaining the dimensional stability and mechanical integrity of the structural element in question.

Depending on the countries, this water resistance is codified or regulated by specific standards. Thus, reference may be made to the standards mentioned below, depending on the element manufactured:

plaster tile: NF P72-210-1 (April 1994);
plasterboard: ASTM 630/630M-96a;
board with a glass mat: ASTM C1178/1178M (96).

The ASTM 630/630M-96a standard requires in particular that, when such a structural element is immersed in water for two hours, the water uptake by the plaster substrate is less than 5% and the water absorption on the surface (called the Cobb equivalent) is less than 160 g/m$^2$.

For the purposes of making a structural element, as defined above, water-repellent in accordance with document JP-A-0 730 411, it is known to use a water-repellent agent comprising at least one silicone compound in aqueous and basic medium and to homogeneously incorporate the latter into the substrate of the element in question.

According to JP-A-0 733 0411, the silicone compound is emulsified with water. An oxide or hydroxide of a metal from group IIa, for example calcium, is then added to the emulsion. The additive thus obtained is then incorporated into the dry matter in order to obtain the plaster substrate in the wet state, which substrate is then formed and then dried.

In practice, it appears that the aforementioned composition has the advantage of causing the silicone compound to cure or crosslink, thereby enhancing the water-repellency of the latter; however, this is accompanied by significant evolution of hydrogen, which is particularly dangerous.

Document JP-A-80109251 discloses a water-repellent composition for cement, comprising a silicone compound, the nature of which is not specified, and bentonite as mineral additive.

Document SU-A-1409607 discloses a water-repellent composition for plaster, comprising a sodium methyl siliconate or ethyl siliconate, and bentonite as mineral additive.

In practice, such a composition is able to swell, causing rheological problems of the substrate in the slurry state.

It appears in practice to be difficult to meet the abovementioned standards using contents of silicone compound of less than 1% by weight, said compound being, moreover, very costly.

This water repellency is achieved by using any process comprising, in general, at least the following steps:

(a) homogeneously mixing a dry material, comprising mostly at least one hydratable calcium sulfate, the abovementioned water-repellent agent, and water and preforming said substrate in the wet state;

(b) drying the preformed substrate in order to obtain said substrate formed in the solid and dry state.

With such a process, it is difficult to control the amount of water-repellent agent incorporated into the plaster substrate, for example in the form of a silicone oil, and therefore the potential of the water-repellent agent is not exploited.

The object of the present invention is therefore to better control the water repellency or a structural element using a water-repellent agent comprising at least one silicone compound, in particular to increase its water repellency within the cured plaster.

The object of the present invention is also to improve the introduction and mixing of the water-repellent agent in the process defined above.

In accordance with the present invention, it has been discovered that the addition, as a homogeneous mix, of a mineral additive comprising at least one mineral component having a synergistic water-repellency affinity with the silicone compound to the dry matter from which the substrate is preformed in the liquid state allowed the water repellency of the cured plaster to be increased to a significant extent.

The expression "synergistic water-repellency affinity" should be understood to mean the property whereby, by adding the mineral additive according to the present invention, and all other things being equal, the water repellency of the cured-plaster substrate is increased by at least 20%, in Cobb equivalent, according to the ASTM 630/630M-96a standard, and/or, for the same water resistance, the amount of water-repellent agent required is reduced by at least 20%.

Preferably, but nonlimitingly, the mineral component does not react with the silicone compound in the sense that, after two hours, mixing 0.1 g of said silicone compound with the mineral component in aqueous medium may release an amount of hydrogen of less than or equal to 6 ml under standard temperature and pressure conditions.

The evolution of hydrogen is measured according to the following operating method.

An apparatus identical to that described in the NFT 77-150 standard on page 6 is used. The principle consists in bringing the mineral additive and the silicone compound into contact with each other, in aqueous medium in the reactor, in the same proportions by weight as those in the homogeneous mix defined above, in the slurry state, that is to say with the mixing water. The evolution of hydrogen is monitored over time, at a controlled temperature of 23° C. The volume of hydrogen evolved after two hours is noted.

A mineral component that hardly reacts at all with the silicone compound is one which produces a parasitic evolution of hydrogen, after two hours, of less than or equal to 6 ml under standard temperature and pressure conditions.

A mineral additive according to the invention therefore makes it possible to increase the water resistance of a structural element according to the invention and/or to reduce the amount of water-repellent agent required for a predetermined level of water resistance.

According to the present invention, with regard to a crystalline mineral component containing a hydroxyl functional group which is nonionizable in an aqueous medium, one possible explanation (among other hypotheses) for the observed synergy, supported by the experimental protocol described below, is the formation of at least one hydrogen bond, in neutral or acid aqueous medium, between, on one side, the hydrogen of a nonionizable hydroxyl functional group of the mineral component and, on the other side the oxygen of the silicone compound.

In other words, according to the invention, the mineral component adsorbs the silicone compound. Furthermore, the homogeneous mixing of the mineral additive into the plaster substrate allows the homogeneous distribution and the fixation of the silicone compound.

During the curing, the hydroxyl ions naturally present in the aqueous medium may bring about three-dimensional crosslinking of the silicone compound, this being manifested by an improvement in the water-repellency properties of the cured plaster over time.

Consequently, the adsorption of the silicone compound on the mineral component makes it possible to control its reactivity, that is to say to delay the latter until the moment of curing the plaster.

Preferably, according to the invention, the reactive silicone compound is a linear, cyclized or branched macromolecular water-repellent compound containing polysiloxane units, each of which is chosen from the group consisting of the groups $(R_1R_2R_3SiO_{1/2})$, $(R_1R_2SiO)$ and $(R_2SiO_{3/2})$, with:

$R_1$=H, Cl, or any other halogen, or an alkoxy $R_2$=a branched or unbranched phenyl or alkyl $R_3$=a branched or unbranched phenyl or alkyl.

By way of example, the silicone is an alkyl hydrogenopolysiloxane, such as methyl hydrogenopolysiloxane, in the form of an oligomer (several tens or more of siloxane units), in the form of an oil or of an aqueous emulsion.

Preferably, according to the invention, the reactive mineral component is a crystalline mineral material which contains a hydroxyl functional group which is nonionizable in aqueous medium, for example a clayey material and/or a crystalline silica.

As an example of such a crystalline mineral material, mention may be made of a clayey material, preferably one which does not swell in aqueous medium (unlike pentonite), comprising especially an aluminosilicate, for example an illite and/or a kaolin.

A mineral additive according to the invention optionally comprises an inert mineral component.

In accordance with the invention, the mineral additive is inert with respect to calcium sulfate, initially in powder form. It comprises, for example, a clayey material, as mentioned above.

By virtue of the invention, and when a papermaking-type process is used, especially by filtration of a slurry, to manufacture GFB boards based on cellulose fibers, it has been found that the incorporation of a mineral additive comprising, for example, a clayey material made it possible to retain the water-repellent agent within the plaster substrate preformed in the wet state. This makes it possible to increase, for the same content of water-repellent agent, the water resistance of the GFB boards manufactured by such a process, and in particular to limit the amount of this agent in the recycled water of hydration.

The present invention also has the following secondary features:

the composition by weight of the mineral additive in the dry matter, in combination with the amount and nature of the water-repellent agent, is tailored to give the cured-plaster structural element a water resistance which meets the aforementioned standards, and in particular the ASTM 630/630M-96a standard, for a so-called GFB board;

the reactive silicone compound represents a proportion by weight of the total dry matter introduced of at least 0.1% and preferably between 0.1 and 1%;

the reinforcing fibers, for example cellulose fibers, are distributed in the cured-plaster substrate; the structural element is, for example, a so-called GFB fiberboard;

the element has the shape of a board and the two faces of the cured-plaster substrate are coated with two sheets of cellulose fibers, for example with cardboard;

the mineral additive has a particle size distribution such that the particles having a size of less than or equal to 63 μm represent a proportion by weight of at least 85% of said mineral additive; preferably, the mineral additive has a loss on ignition at 900° C. of less than 30%; by way of example, the mineral additive has a loss on ignition of less than 30%; by way of example, the mineral additive represents a proportion of the total weight of the ingredients, excluding water of hydration, of at least 5% and preferably at most 15%;

the hydratable calcium sulfate is obtained from a natural gypsum or from a sulfogypsum, the latter coming from the desulfurization of gases from thermal power stations;

the reactive silicone compound may be introduced during the manufacture of the structural element, in the form of an emulsified composition of a silicone in water;

by way of example, in combination, the mineral additive comprises a clayey material, a crystalline silica aid, optionally, an inert mineral supplement compatible with the clayey material and dispersible in the cured-plaster substrate;

the composition by weight of the mineral additive is tailored, in conjunction with the water-repellent agent, also to give the structural element, used in wall partitions, a fire resistance which meets the so-called "GKF" standards according to DIN 18180 and 4102 (part IV);

the inert mineral supplement, if it is present in the mineral additive, is, for example, dolomite and the mineral additive then comprises, in approximately equal proportions by weight, the clayey material (including the crystalline silica) and the inert mineral supplement; this particular mineral additive makes it possible, with the water-repellent agent, to obtain boards which are both fire resistant and water resistant and which in particular meet both the GKF standards and the aforementioned water-resistance standards, whatever the process used to obtain the plasterboards or to obtain so-called "GFB" fiberboards;

reinforcing fibers, preferably mineral fibers compatible with the hydratable calcium sulfate, for example glass fibers, are also distributed in the cured-plaster substrate in a proportion by weight with respect to the total of the dry matter introduced of less than 1% when it is desired, in particular, to improve the fire resistance of the boards;

by way of another example, the mineral additive comprises an amorphous silica and/or diatomaceous earth and/or ferrite and/or a zeolite;

more generally, the mineral additive according to the invention comprises a mineral component having an affinity with respect to the silicone compound, finely ground (for example $\leq 1$ $\mu$m), taken from clays; smectites are preferred, then illites and kaolinites;

the structural element according to the invention has a shape chosen from the group consisting of tiles, panels and boards.

The present invention also relates to a water-repellent composition comprising as homogeneous mix, a water-repellent agent comprising a silicone compound and a mineral additive comprising at least one mineral component having a synergistic water-repellency affinity with said silicone compound, as defined above.

The invention also relates to the use of this composition within a plaster substrate of a prefabricated structural element.

The invention also relates to the use of a mineral additive to increase the water repellency of a water-repellent agent comprising a silicone compound. According to the invention, the mineral additive comprises at least one mineral component having a synergistic water-repellency affinity with said silicone compound, as defined above.

The invention also relates to a process for manufacturing a structural element comprising a substrate based on cured plaster, in which said substrate is obtained by at least the following steps:

a) dry matter comprising mostly at least one hydratable calcium sulfate, a water-repellent agent comprising at least one silicone compound and water of hydration are mixed homogeneously and said substrate is preformed in the wet state;

b) the preformed substrate is dried in order to obtain the substrate formed in the solid and dry state.

According to the invention, during step (a), a mineral additive, comprising at least one mineral component having a synergistic water-repellency affinity with said silicone compound, as defined above, is also mixed.

Preferably, the ingredients defined in step (a) are mixed directly and together, in order to obtain the substrate in the wet and preformed state.

Such a process may have the following variants:

the water-repellent agent is in liquid form, particularly in the form of an oil, or of a homogeneous aqueous suspension, while the mineral additive is a powder in divided form;

the water-repellent agent is mixed homogeneously with the dry matter comprising the mineral additive, before said dry matter is mixed with the water of hydration, in order to obtain the substrate preformed in the wet state;

the water-repellent agent is mixed homogeneously with the water of hydration, before the latter is mixed with the dry matter comprising the mineral additive, in order to obtain the substrate preformed in the wet state;

the water-repellent agent and the mineral additive are mixed homogeneously in order to obtain a powder imbibed with oil on the surface, which powder is then incorporated into the dry matter and/or the mixing water before they are homogeneously mixed, in order to obtain the substrate preformed in the wet state;

the water-repellent agent, in the form of an oil or an aqueous emulsion, is homogeneously dispersed in the mixing water, whereas the mineral additive is distributed homogeneously in the dry matter.

According to the present invention, it has been discovered that if the homogeneous mixing of the above-defined ingredients, prior to the preforming of the substrate in the wet state, also includes a mineral additive as defined above, and in particular a clayey material, then this mineral additive is able to act as a retention agent for the reactive silicone compound within the plaster-based substrate.

The solution according to the invention has the major advantage of remaining compatible with the various processes known at the present time for manufacturing the structural elements considered by the present invention, for example:

(a) by casting a plaster-based slurry between two sheets of cellulose fibers, in the form of cardboard, or between two mats, wovens or sheets of mineral fibers;

(b) by filtering a slurry based on cellulose fibers and on plaster, using a papermaking-type process, in order to obtain so-called GFB fiberboards;

(c) by so-called semi-wet or semi-dry compression, depending on the water content (GFB fiberboards).

Applied to each of these processes, the invention makes it possible to increase the efficiency of incorporation of the water-repellent agent within the plaster substrate. For example, for a process involving the filtration of a slurry, of the papermaking type, the invention makes it possible to keep the water-repellent agent within the cake obtained by filtration, rather than concentrate it in the filtrate, despite recycling the water of hydration.

Throughout the description below, the term "cured plaster" or "plaster" will be reserved for calcium sulfate dihydrate ($CaSO_4.2H_2O$) or regenerated gypsum.

The term "hydratable calcium sulfate" should be understood to mean a mineral compound or a composition consisting of or comprising an anhydrous calcium sulfate (anhydrite II or III), a calcium sulfate hemihydrate ($CaSO_4.1/2H_2O$), whether in the crystalline—$\alpha$ or $\beta$—form of the latter.

The term "silicone compound" should be understood to mean any compound capable of being obtained by the polymerization of a silicone-type monomer unit, whether this is, for example, a chlorosilane, a siliconate, an, alkoxysilane or a silanol.

The term "cellulose fibers" should be understood to mean discrete elements such as fibers, filaments and chips, based on natural, regenerated, recycled or modified cellulose; preferably, the cellulose fibers in question are those generally used in the composition of papers and cardboards.

The term "mineral fibers" should be understood to mean inorganic fibers, for example glass fibers, which may or may not be treated in order to remain chemically stable and inert once they have been incorporated into the cured-plaster substrate of the prefabricated structural elements considered by the present invention.

As is known, dolomite is a mixed calcium and magnesium carbonate.

Throughout the present invention, unless otherwise specified, all the compositions are expressed with respect to the total weight of the dry matter introduced, including the water-repellent agent. These compositions may be easily transposed with respect to the final weight of the prefabricated, finished and dry structural element, taking into account the water of rehydration of the calcium sulfate.

According to the present invention, the mineral additive used does not develop by itself, in aqueous medium, an alkaline pH. This excludes as mineral component any material capable of releasing, in aqueous medium, OH$^-$ ions, for example:

a) a mineral base, such as calcium dihydroxide; or b) a metal silicate, for example containing no hydroxyl ions, for example a calcium silicate, such as, that sold by Lafarge under the reference CAP 52,5 CP2; or c) an aluminate, for example a calcium aluminate, such as that sold by Lafarge under the reference SECAR 80.

In this regard, reference will be made to FIG. 1, which shows the evolution of hydrogen (at atmospheric pressure and at 23° C.) for three mixes according to the following representation:

the solid line corresponds to a mix comprising 0.1 g of $Ca(OH)_2$+0.1 g of MHPS (BS94 from Wacker)+65 ml of water;

the dotted line corresponds to a mix comprising 1.72 g of a calcium silicate (the abovementioned commercial ref.)+0.1 g of MHPS (BS94 from Wacker)+65 ml of water;

the dot-dash line corresponds to a mix comprising 1.72 g of a calcium aluminate (the abovementioned commercial ref.)+0.1 g of MHPS (BS94 from Wacker)+65 ml of water.

The volume expressed in ml is plotted on the x-axis and the contacting time, in hours, is plotted on the y-axis.

This is because it is sufficient to mix any of the aforementioned mineral components (a) to (c) with a reactive silicone compound, for example methyl hydrogenopolysiloxane (abbreviated to MHPS), in aqueous medium, to immediately observe a violent and abundant evolution of hydrogen.

As indicated previously, a reactive mineral component of the bentonite type appears to be excluded for the manufacture of certain structural elements comprising a substrate based on cured plaster, such as plasterboards.

EXAMPLE 1

The example given below illustrates, in the case of plasterboards, the problem of spreading the substrate, or slurry, in the wet state, the problem of bonding between the cured-plaster substrate and the sheets of cellulose fibers or cardboard, and the problem of longer drying time, problems which are generated by the use of bentonite.

Operating method:

Boards were manufactured on a laboratory production line, by casting between two cardboard sheets, and drying using the appropriate drying profile without calcining the cured plaster.

The water-repellent agent used is in the form of a silicone oil (MHPS) (Wacker BS 94).

The following measurements were made throughout the manufacturing process:

Spread: measurement in millimeters in two directions perpendicular to the diameter of a disk, after being spread over a glass plate. The disk is obtained by vertically lifting a cylindrical mold having an internal diameter of 60 mm±0.1 mm and a height of 60 mm±0.1 mm, filled with the plasterboard slurry. The time taken to lift the mold is identical to that for casting the slurry between the two cardboard sheets.

Shear bonding: this is the time needed for the crystallization of the set plaster to be characterized by adhesion to the paper during a peel test. This bonding must be sufficient to enable a plasterboard to be introduced into an industrial dryer without the risk of debonding from the cardboard.

Drying time: the time needed to reach at least 0.2% moisture inside the boards dried according to the appropriate profile, without calcining the cured plaster.

Dry bonding: in a peel test of a board containing less than 0.2% moisture, the quality of the bond between the set plaster and the paper must be perfect and leave no trace of set plaster visible. In the case of poor bonding, the measurement is expressed as the amount of set plaster visible.

The results obtained are given in Table A below.

TABLE A

| Mineral additive | Amount of mineral additive (g) | Spread (mm) | Sheer bonding (min) | Drying time (min) | Dry bonding (% of set plaster visible) |
|---|---|---|---|---|---|
| RG1842 | none | | 180 | 7 | 49 | 0 |
| RG1843 | (*) | 113 | 194 | 8 | 49 | 0 |
| RG1844 | bentonite | 113 | 110 | >12 | 69 | 56 |

(*) composition A of Table 1 below.

EXAMPLE 2

For the manufacture of so-called GFB boards, of 1.1 relative density, the filterability of three slurries was tested under a vacuum of 0.2 bar, these slurries being obtained by mixing, respectively:

1) 133 g of hydratable calcium sulfate (semihydrate); 12 g of dry pulp and 388 g of water;

2) 133 g of hydratable calcium sulfate (sulfogypsum), 12 g of dry pulp, 15.78 g of a nonswelling clayey material of composition X from Table 1 below and 389 g of water;

3) 133 g of hydratable calcium sulfate (sulfogypsum), 12 g of dry pulp, 15.78 g of bentonite and 388 g of water.

Figure 2:
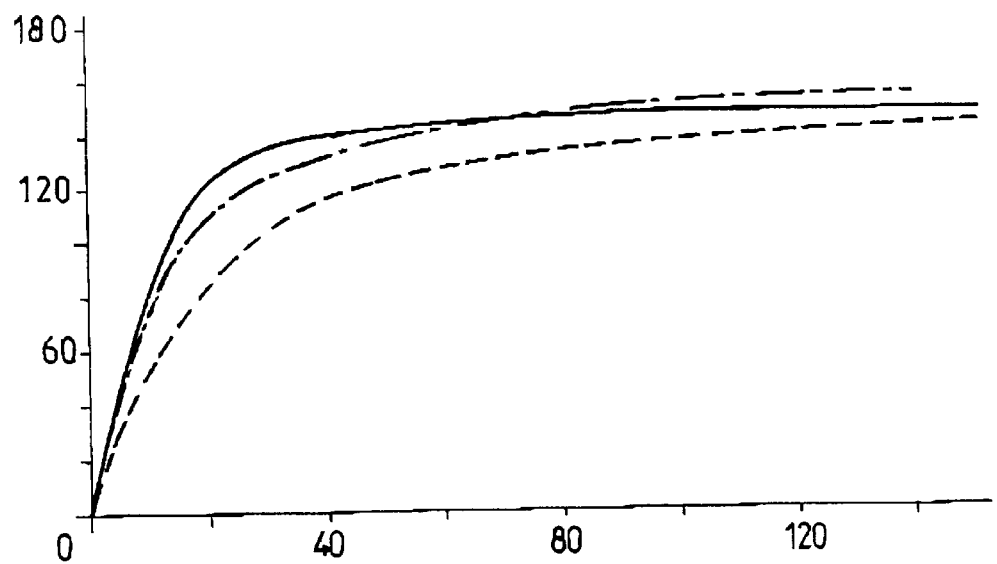

The filterability of the slurry, having a relative density of 1.1, under a vacuum of 0.2 bar, is shown by the graph in FIG. 2, in which the volume of the filtrate expressed in ml is plotted on the y-axis and the filtration time expressed in seconds is plotted on the x-axis. The following correspondence table should be noted:

the solid line corresponds to the slurry according to (1);

the dot-dash line corresponds to the slurry according to (2); and the dotted line corresponds to the slurry according to (3).

Whatever the filtration time, the volume of water recovered in the case of mix (3) is much less than that recovered in the case of mixes (1) and (2), these being of the same order of magnitude for both (1) and (2). Thus, after 20 s, only 80 ml of water are recovered from mix (3), compared with 110 and 120 ml in the case of mixes (2) and (1), respectively.

EXAMPLE 3

This example is particularly important, in that it shows, firstly, the chemical reaction existing between an MHPS and a conventional mineral additive and, secondly, the absence of a chemical reaction existing between the same MHPS and a clayey material.

For this purpose, 0.1 g of MHPS (reference BS94 from Wacker), in 85 ml of water, are mixed, respectively, with 0.1 g of $Ca(OH)_2$ and 1.8 g of a clayey material, namely composition X according to Table 1.

A continuous evolution of hydrogen is obtained in the first case, while in the second case there is no evolution of hydrogen, in accordance with the graph in FIG. 1.

Figure 3:
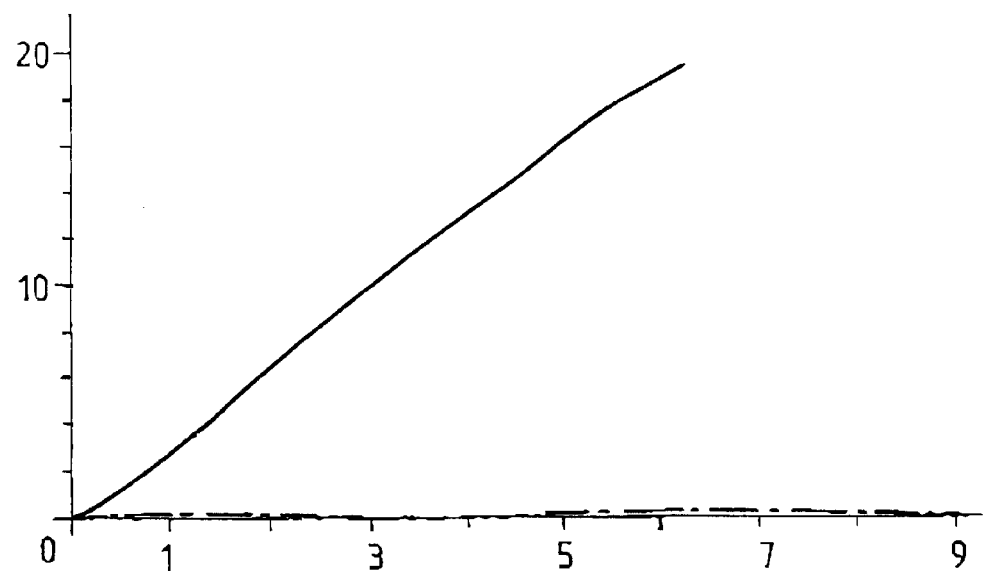

This is illustrated in FIG. 3 with the same conventions as in FIG. 1.

The solid line represents the evolution of hydrogen in the first mix and the dot-dash line the evolution in the second mix.

The formulations of the mineral-additive compositions (X) and (Z) are given in Table 1 below, in percentages by weight.

TABLE 1

|  | Composition X | Composition Z |
|---|---|---|
| Mineralogical composition (%) |  |  |
| Kaolin | 25 | 30 |
| Illite | 10 | 25 |
| Quartz | 15 | 45 |
| Dolomite | 50 | 0 |
| Calcined chemical composition (%) |  |  |
| $SiO_2$ | 43 | 72.4 |
| $TiO_2$ | 1.1 | 1.6 |
| $Al_2O_3$ | 15 | 21.5 |
| $Fe_2O_3$ | 1.6 | 1.5 |
| $K_2O$ | 1.2 | 2.1 |
| CaO | 23 | 0.2 |
| MgO | 14 | 0.3 |
| Particle size distribution |  |  |
| 63 μm screen oversize | <15% | <1.7% |
| Loss on ignition at 900° C. | 26.5% | 5.7% |

EXAMPLE 4

Water-repellency of cured plasterboards with methyl hydrogenopolysiloxanes in the form of oils.

4.1/ GFB Fiberboards (Cellulose Fibers) with and without Filtration 4.1.1/ Heavy GFB Fiberboards Obtained with Filtration According to a "Papermaking" Process The board is manufactured according to the following successive steps:

Preparation of a pulp, by mixing 8 liters of water (tap water or water coming from the recycling of the filtrate from boards of the same formulation) with 273 g of newsprint, followed by pulping using a RAYNERI® mixer, Turbotest 207370 model, for 20 minutes at speed 6 and then for 25 minutes at speed 10.

Weighing a 2400 g quantity of pulp in a HOBART® bowl, N-50G model, i.e. approximately 2321 g of water and 79 g of dry pulp.

Introduction of a variable amount, depending on the trials (see Table 2), of methyl hydrogeno-polysiloxane of reference 1107 from Dow Chemical or reference MH15 from Bayer.

Weighing, in a separate container, an 800 g quantity of hydratable calcium sulfate ($CaSO_4.1/2H_2O$), obtained by the curing of a natural gypsum or of a sulfogypsum coming from the desulfurization of flue gases.

Introduction into this hydratable calcium sulfate, and mixing using a suitable mechanical means, a variable amount of mineral additive of composition (X) or (Z), depending on the trials (see Table 2).

Introduction of the hydratable calcium sulfate, to which the above additive has been added, into the HOBART® bowl and mixing at speed 1 for 15 seconds with an N5B NSF blade. Scraping for 15 seconds and mixing at speed 1 for 90 seconds.

Deposition of the plaster suspension thus obtained in a mold provided with a permeable cloth, of dimensions 25.5× 25.5 $cm^2$ or 60×40 $cm^2$, depending on the size of the board desired.

Mechanical pressing until a cake approximately 12.5 mm in thickness is obtained.

Application of pressure for at least 20 seconds in order to expel the air and water through the filtration cloth.

Demolding.

Standing at room temperature until complete dehydration of the hydratable calcium sulfate.

Drying the plaster with a suitable temperature profile, without calcining the cured plaster.

Table 2 below summarizes the characteristics of the GFB boards having a thickness of approximately 12.5 mm, these being manufactured using this protocol in a mold of dimensions 25.5×25.5 $cm^2$.

TABLE 2

| | | | | | | | | | Tap water | | | | | |
|---|---|---|---|---|---|---|---|---|---|---|---|---|---|---|
| Trial | Hydratable calcium sulfate | | | Mineral additive | | | Dry matter in the pulp | | Water-repellent agent (silicone oil) | | | Total dry weight | Weight | Water/ Total dry | % Water uptate | Relative |
| No. | Type | (g) | (%) | Type | (g) | (%) | (g) | (%) | Type | (g) | (%) | (g) | (g) | weight | (%) | density |
| 1 | S | 800 | 91 | — | — | — | 79 | 9 | — | — | 0.00 | 879 | 2321 | 2.64 | 29.0 | 1.16 |
| 2 | S | 800 | 91 | — | — | — | 79 | 9 | — | — | 0.00 | 879 | 2321 | 2.64 | 25.0 | 1.19 |
| 3 | S | 800 | 90.5 | — | — | — | 79 | 9 | DC | 5 | 0.5 | 884 | 2321 | 2.62 | 27.0 | 1.17 |
| 4 | S | 800 | 90 | — | — | — | 79 | 9 | DC | 10 | 1.0 | 889 | 2321 | 2.61 | 19.0 | 1.19 |
| 5 | S | 800 | 81.5 | Z | 100 | 10 | 79 | 8 | DC | 5 | 0.5 | 984 | 2321 | 2.36 | 5.0 | 1.12 |
| 6 | N | 800 | 81.5 | X | 100 | 10 | 79 | 8 | MH | 3 | 0.5 | 982 | 2321 | 2.36 | 3.1 | 1.18 |

S: sulfogypsum
N: natural gypsum
DC: Dow Chemical 1107 silicone oil
MH: Bayer MH15 silicone oil The percentage water uptake after 2 hours is measured according to the ASTM 630/630M-96a standard, but on specimens of dimensions 10×10 cm², when the standard recommends specimens of one square foot. The results obtained according to this protocol are less favorable than the presence of a water-repellent agent On the other hand, as soon as a mineral additive according to the invention is used, very low water uptakes are obtained, in accordance with the standard.

The following results are obtained, as in Table 3.

TABLE 3

| Trial No. | Hydratable calcium sulfate Type | Hydratable calcium sulfate (g) | Mineral additive (g) | Dry matter in the pulp | Water-repellent agent Type | Water-repellent agent (g) | Total dry weight (g) | Tap water (g) | Relative density | % Water uptake (%) |
|---|---|---|---|---|---|---|---|---|---|---|
| 1 | S | 250 |  | 62.5 |  |  | 312.5 | 2021 | 0.45 | 147 |
| MP99075 | S | 250 |  | 62.5 | BS94 | 2.7 | 315.2 | 2021 | 0.40 | 119 |
| MP99078 | S | 250 | * 53.4 | 62.5 | BS94 | 2.7 | 369 | 2021 | 0.45 | 4.8 |

*Composition X according to Table 1 the results that would have been obtained using specimens of dimensions according to the standard.

Trials 1 and 2 are controls: the boards containing no water-repellent have high percentages of water uptake. It is found that when no mineral additive is used (Trials 3 and 4), the water-repellency results are not good, even when a water-repellent agent is present. On the other hand, as soon as a mineral additive according to the invention is used, very much lower water uptakes are obtained, in accordance with the standard.

4.1.2 Light GFB Fiberboards (Cellulose Fibers) Obtained with Filtration Using a Papermaking Process The board is manufactured according to the following successive steps:

preparation of a pulp, by mixing 8 liters of water (tap water or water coming from the recycling of the filtrate from boards of the same formulation) with 273 g of newsprint, followed by pulping using a Rayneri mixer, Turbotest 207370 model, for 20 minutes at speed 5 and then for 25 minutes at speed 10.

Weighing of a 2083.5 g amount of pulp in a Hobart bowl, N-50G model, i.e. approximately 2021 g of water and 62.5 g of dry pulp.

Introduction of 2.7 g of methyl hydrogeno-polysiloxane of reference BS94 from Wacker and mixing for 2 minutes.

Introduction of a 53.4 g amount of additive X (cf. Table 1) and mixing for 5 minutes.

Weighing, in a separate container, of a 250 g amount of hydratable calcium sulfate ($CaSO_4.H_2O$) obtained by the curing of a natural gypsum or of a sulfogypsum coming from the desulfurization of flue gases.

Introduction of the calcium sulfate into the Hobart bowl and mixing at speed 1 for 15 seconds using an N5B NSF blade. Scraping for 15 seconds and mixing at speed 1 for 90 seconds.

Trials 1 and 2 are controls: the boards containing no water-repellent agent have high percentage water uptakes. It may be seen that when a mineral additive is not used (Trials 3 and 4), the water-repellency results are not good, even in 4.2 Manufacture of GFB Fiberboards (Cellulose Fibers) by Compression Using a Semi-wet or Semi-dry Process The board is manufactured according to the following steps:

Preparation of a paper fluff by grinding newsprint in a Pallman-type apparatus.

Weighing of a quantity of fluff and introduction into a Lodige of the M20G.RE or M5G type.

Weighing of a variable quantity of mineral additive of formula Z or X, depending on the trials.

Spraying of methyl hydrogenopolysiloxane onto the mineral additive.

Introduction of the mix obtained into the Lodige of M20G.RE or M5G type and mixing so as to obtain a homogeneous mix.

Weighing, in a separate container, of a quantity of natural hydratable calcium sulfate or a hydratable calcium sulfate coming from the desulfurization of flue gases.

Introduction of this hydratable calcium sulfate into the Lodige of M20R.GE or M5G type and mixing so as to make a homogeneous mix.

Deposition of the above homogeneous mix into a mold of dimensions 40×40 cm² and spraying a quantity of water.

Pressing using a 50-tonne KRATOS-type press with a separate pump of reference PKPS until a 12.5 mm thick cake is obtained.

Application of the pressure for at least 20 seconds in order to expel the water through the drainage cloth, which is placed in the lower part of the mold.

Demolding.

Standing at room temperature for at most 1 hour 30 minutes until the plaster is completely hydrated.

Drying with a suitable temperature profile without calcining the set plaster.

Comment: In the case of the manufacture of a board without a mineral additive, the methyl hydrogenopolysiloxane is introduced into the water.

The table below summarizes the characteristics of the approximately 13 mm thick panels manufactured using this protocol in a mold of dimensions 40×40 cm².

TABLE 3A

| Trial No. | Hydratable calcium sulfate Type | (g) | Mineral additive Type | (g) | Water-repellent agent (silicone oil) Type | (g) | Total weight (g) | Tap water Weight (g) | Water/dry weight ratio | % Water uptake after 2 h (%) |
|---|---|---|---|---|---|---|---|---|---|---|
| 1 | S | 1993 | | | | | 2430 | 1380 | 0.57 | 30.5 |
| 2 | S | 1993 | | | MH | 13 | 2006 | 1380 | 0.56 | 25 |
| 13 | S | 1886 | X | 130 | MH | 13 | 2443 | 1380 | 0.56 | 2 |

The water uptake after 2 hours is measured as previously.

It is found that the water uptake results are better when the boards are manufactured with a water-repellent agent and a mineral additive, both in accordance with the invention.

4.3/ So-called GKF Plasterboards

Boards called GKFs because of their fire resistance, that is to say boards which comprise a cured-plaster substrate whose faces are coated with a cardboard, were manufactured on an industrial production line by casting plaster between two cardboard sheets. The water-repellent agent used is in the form of silicone oil (Wacker BS94).

The following results are obtained, according to Table 4.

TABLE 4

| Silicone compound* in % of the weight of the finished board | Mineral additive (X) in % of the final weight of the board | Water uptake after 2 h immersion on 30 × 30 cm specimens |
|---|---|---|
| 0.42% | 0% | 16.8% |
| 0.36% | 3.72% | 5.5% |
| 0.36% | 7.18% | 4.25% |

*Commercial reference WACKER ® BS94

4.4 Manufacture of Water-repelled Reinforced Molded Elements Obtained by Dry Compression, Using Various Ways of Introducing the Water-repellent Agent This example illustrates the manufacture of test pieces of dimensions 2×2×18 cm, during which a silicone oil is applied to various supports, so as to make a cured-plaster element water-repellent, with or without fibers.

The following products and conditions were used:

Dry matter:
  Hydratable calcium sulfate: plaster coming from the curing of a natural gypsum, having a pH of 7.22 measured as a 10% suspension after stirring for 10 minutes.
Mineral additive:
  Composition X or Z
  Silica C400 quartz from Sifraco
  Dolomite from Lhoist
  Cellulose fibers identical to those in Example 1.2.
Silicone compound: silicone oil (methyl hydrogenopolysiloxane) in oligomeric form containing approximately 40 units, sold under the name MH15® by Bayer.
Operating conditions:
  Spraying of the silicone oil onto the water-repellency support, namely the hydratable calcium sulfate, or the mineral additive, or the cellulose fibers. The silicone compound is introduced in an amount of 0.5% of the weight of the total dry matter introduced The quantity of water-repellency support varies depending on the trials (cf. Table 5).
  Mixing for one minute in a HOBART mixer.
  Mixing for 30 seconds with the water of hydration (the water of hydration/dry matter ratio (W/D) is 0.6).
  Filling of the mold.
  Demolding after 30 minutes and then standing for 4 hours in a plastic bag.
  Drying at 40° C. until constant weight.
  Conditioning at 23° C. and 50% RH.

The water uptake is measured, after immersion for 2 hours, on two test pieces in a manner identical to the conditions described in Example 1.1.

The water uptake results for the control and water-repelled test pieces according to the invention are given in Table 5 below.

When there are fibers or mineral additives, the quantities are expressed here as a percentage of the total dry matter introduced.

TABLE 5

| | Mineral additive (%) | Cellulose fibers (%) | Water uptake after 2 h |
|---|---|---|---|
| TS1 | — | — | 5.3 |
| | | | 7.3 |
| TS2 | — | — | 5.2 |
| | | | 6.0 |
| Z + S | 10 | — | 1.9 |
| | | | 2.5 |
| X + S | 10 | — | 4.4 |
| | | | 4.5 |
| C400 + S | 10 | — | 9.8 |
| | | | 10.1 |
| F + S | — | 5 | 22.5 |
| | | | 22.8 |
| D + S | 10 | — | 7.3 |
| | | | 8.7 |

TS1 and TS2 are trials using test pieces made water-repellent using the same proportion of silicone compound introduced directly into the plaster suspension.
Z + S: the silicone is sprayed onto the mineral additive of composition Z
X + S: the silicone is sprayed onto the mineral additive of composition X
C400 + S: the silicone is sprayed onto the C400 quartz mineral additive from Sifraco
F + S: the silicone is sprayed onto the cellulose reinforcing fibers
D + S: the silicone is sprayed onto the dolomite mineral additive.

It should also be noted here that the best results, with respect to the controls, are obtained when mineral additives of composition X and Z are used.

What is claimed is:

1. A water-resistant prefabricated structural element comprising a substrate based on cured plaster, said substrate obtained by at least the following steps:
  (a) homogeneously mixing a dry material, comprising mostly at least one hydratable calcium sulfate, a water-repellent agent comprising at least one silicone compound, and water and preforming said substrate in the wet state;

(b) drying the preformed substrate in order to obtain said substrate formed in the solid and dry state;
wherein the homogeneous mix, prior to the preforming of the substrate in the wet state, also includes a mineral additive comprising at least one mineral component having a synergistic water-repellency affinity with said silicone compound.

2. The element as claimed in claim 1, wherein a parasitic amount of hydrogen is at least 15% less than an effluent amount of hydrogen.

3. The element as claimed in claim 1, wherein after two hours, mixing 0.1 g of the silicone compound with the mineral additive in aqueous medium releases an amount of hydrogen of less than or equal to 6 ml, and is a crystalline mineral material which includes a hydroxyl functional group which is nonionizable in aqueous medium.

4. The element as claimed in claim 3, wherein the silicone compound and the mineral component form between them, in acid or neutral medium, at least one hydrogen bond between, on one side, the hydrogen of a nonionizable hydroxyl functional group of the mineral component and, on the other side, the oxygen of the silicone compound.

5. The element as claimed in claim 4, wherein the mineral component is a clayey material comprising an aluminosilicate.

6. The element as claimed in claim 1, wherein the mineral component comprises a crystalline silica.

7. The element as claimed in claim 1, wherein the mineral component is an inert mineral component.

8. The element as claimed in claim 1, wherein the reactive silicone compound is a linear, cyclized or branched macromolecular water-repellent compound containing polysiloxane units, each of which is chosen from the group consisting of the groups $(R_1R_2R_3SiO_{1/2})$, $(R_1R_2SiO)$ and $(R_2SiO_{3/2})$, with:

$R_1$=H, Cl, or any other halogen, or an alkoxy $R_2$=a branched or unbranched phenyl or alkyl $R_3$=a branched or unbranched phenyl or alkyl.

9. The element as claimed in claim 8, wherein the reactive silicone compound is an alkyl hydrogeno-polysiloxane.

10. The element as claimed in claim 1, wherein the reactive silicone compound represents a proportion by weight of the total dry matter introduced of at least 0.1%.

11. The element as claimed in claim 1, wherein the mineral additive has a particle size distribution such that the particles having a size of less than or equal to 63 μm represent a proportion by weight of at least 85% of said mineral additive.

12. The element as claimed in claim 1, wherein the mineral additive has a loss on ignition at 900° C. of less than 30%.

13. The element as claimed in claim 1, wherein the mineral additive represents a proportion of the total weight of the ingredients, excluding water, of at least 5%.

14. The structural element as claimed in claim 1, wherein, in combination, the mineral additive firstly comprises a clayey material, a crystalline silica and an inert mineral supplement compatible with the clayey material and dispersible in the cured-plaster substrate.

15. The element as claimed in claim 14, wherein the mineral additive comprises dolomite as the mineral supplement.

16. The element as claimed in claim 15, wherein the mineral additive comprises, in approximately equal proportions by weight, the clayey material, the crystalline silica and the inert mineral supplement.

17. The structural element as claimed in claim 1, wherein the composition by weight of said mineral additive in the dry matter, in combination with the amount of the water-repellent agent, is tailored to give said structural element a water resistance such that when the structural element is immersed in water for two hours, the water uptake by the structural element is less than 5% and the water absorption on the surface is less than 160 $g/m^2$.

18. The structural element as claimed in claim 14, wherein the composition by weight of said mineral additive in the dry matter is tailored also to give said structural element a fire resistance which meets the German standards DIN 18180 and 4102 (part IV) relating to a fire-retardant gypsum board in effect as of the filing date of the application.

19. The element as claimed in claim 1, having a shape of a board having two faces, wherein the two faces of the cured-plaster substrate are coated with two sheets of cellulose fibers.

20. The element as claimed in claim 1, having a shape of a board, wherein reinforcing cellulose fibers are distributed in the cured-plaster substrate.

21. The element as claimed in claim 1, wherein mineral fibers compatible with the hydratable calcium sulfate are distributed in the cured-plaster substrate in a proportion by weight of less than 1% of the dry matter.

22. A water-repellent composition comprising, as a homogeneous mix, a water-repellent agent comprising a silicone compound and a mineral additive comprising at least one mineral component having a synergistic water-repellency affinity with said silicone compound.

23. The composition as claimed in claim 22, wherein the mineral component is a crystalline mineral material which includes a hydroxyl functional group which is nonionizable in aqueous medium.

24. The composition as claimed in claim 23, wherein the silicone compound and the mineral component form between them, in acid or neutral medium, at least one hydrogen bond between, on one side, the hydrogen of a nonionizable hydroxyl functional group of the mineral component and, on the other side, the oxygen of the silicone compound.

25. A method of increasing the water repellency of a water-repellent agent comprising a silicone compound, comprising the step of adding a mineral additive to the water-repellant agent, wherein said mineral additive comprises at least one mineral component having a synergistic water-repellency affinity with said silicone compound.

26. A process for manufacturing a structural element comprising a substrate based on cured plaster, comprising the following steps:

a) mixing homogeneously dry matter comprising mostly at least one hydratable calcium sulfate, a water-repellent agent comprising at least one silicone compound and water of hydration;

b) preforming a substrate in a wet state;

c) drying the preformed substrate to obtain the substrate formed in the solid and dry state;
wherein, during step a), a mineral additive, comprising at least one mineral component having a synergistic water-repellency affinity with said silicone compound, is also mixed.

27. The process as claimed in claim 26, further comprising the step of forming a fiberboard using a papermaking process with filtration.

28. The process as claimed in claim 27, further comprising a semi-wet or semi-dry compression step.

29. A plaster substrate of a prefabricated structural element comprising the water-repellant composition as claimed in claim 22.

* * * * *